(12) United States Patent
Lefebvre

(10) Patent No.: US 10,883,424 B2
(45) Date of Patent: Jan. 5, 2021

(54) MULTI-SPOOL GAS TURBINE ENGINE ARCHITECTURE

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 449 days.

(21) Appl. No.: 15/384,959

(22) Filed: Dec. 20, 2016

(65) Prior Publication Data

US 2018/0023481 A1 Jan. 25, 2018

Related U.S. Application Data

(63) Continuation-in-part of application No. 15/266,321, filed on Sep. 15, 2016.
(Continued)

(51) Int. Cl.
*F02C 7/36* (2006.01)
*F02C 3/113* (2006.01)
(Continued)

(52) U.S. Cl.
CPC ............... *F02C 7/36* (2013.01); *B64D 27/10* (2013.01); *B64D 35/04* (2013.01); *F01D 5/026* (2013.01);
(Continued)

(58) Field of Classification Search
CPC .. F02C 3/107; F02C 3/113; F02C 7/36; F02C 3/10; F02C 3/08; F02C 6/206;
(Continued)

(56) References Cited

U.S. PATENT DOCUMENTS 2,548,975 A 4/1951 Hawthorne
2,747,367 A 5/1956 Savin
(Continued)

FOREIGN PATENT DOCUMENTS

CA 2562290 C 10/2013
CA 2970386 1/2018
(Continued)

OTHER PUBLICATIONS

European Search Report dated Mar. 19, 2018 in related EP application No. 17182087.1.
(Continued)

*Primary Examiner* — Patrick Hamo
*Assistant Examiner* — David N Brandt
(74) *Attorney, Agent, or Firm* — Norton Rose Fulbright Canada LLP

(57) ABSTRACT

A multi-spool gas turbine engine comprises a low pressure (LP) spool and a high pressure (HP) spool independently rotatable about a central axis. The LP pressure spool has an LP compressor and an LP turbine. The HP spool has an HP turbine and an HP compressor. An accessory gear box (AGB) is drivingly connected to the HP spool. The LP compressor is disposed axially between the HP compressor and the AGB. A gear train drivingly couples the LP compressor to the LP turbine. The gear train is integrated to the AGB.

24 Claims, 6 Drawing Sheets

Related U.S. Application Data

(60) Provisional application No. 62/363,956, filed on Jul. 19, 2016, provisional application No. 62/363,955, filed on Jul. 19, 2016, provisional application No. 62/363,952, filed on Jul. 19, 2016, provisional application No. 62/363,949, filed on Jul. 19, 2016, provisional application No. 62/363,947, filed on Jul. 16, 2016.

(51) Int. Cl.
| | | |
|---|---|---|
| *F02C 3/107* | (2006.01) | |
| *B64D 35/04* | (2006.01) | |
| *F02C 3/08* | (2006.01) | |
| *F01D 5/02* | (2006.01) | |
| *B64D 27/10* | (2006.01) | |
| *F01D 15/12* | (2006.01) | |
| *F02C 3/10* | (2006.01) | |
| *F02K 3/06* | (2006.01) | |
| *F01D 25/18* | (2006.01) | |
| *F02C 7/32* | (2006.01) | |
| *F16H 57/04* | (2010.01) | |

(52) U.S. Cl.
CPC ............ *F01D 15/12* (2013.01); *F01D 25/18* (2013.01); *F02C 3/08* (2013.01); *F02C 3/10* (2013.01); *F02C 3/107* (2013.01); *F02C 3/113* (2013.01); *F02C 7/32* (2013.01); *F02K 3/06* (2013.01); *F16H 57/0495* (2013.01); *F05D 2220/32* (2013.01); *F05D 2220/323* (2013.01); *F05D 2220/324* (2013.01); *F05D 2220/329* (2013.01); *F05D 2230/70* (2013.01); *F05D 2230/72* (2013.01); *F05D 2240/61* (2013.01); *F05D 2250/36* (2013.01); *F05D 2260/31* (2013.01); *F05D 2260/36* (2013.01); *F05D 2260/40* (2013.01); *F05D 2260/4031* (2013.01); *F05D 2260/40311* (2013.01); *F05D 2260/98* (2013.01); *Y02T 50/60* (2013.01)

(58) Field of Classification Search
CPC ........ F02C 3/145; F02C 7/32; F05D 2260/40; F05D 2260/40311; F05D 2260/4031; F05D 2270/023; F05D 2250/36; F05D 2240/61; F05D 2260/31; F05D 2230/70; F05D 2220/324; F05D 2260/36; F05D 2230/72; F05D 2220/329; F05D 2260/98; F05D 2220/32; F05D 2220/323; F04D 19/026; F04D 29/044; F04D 29/054; F01D 5/026; F01D 15/12; F01D 25/18; B64D 35/04; B64D 27/10; F16H 57/0495; F02K 3/06; Y02T 50/671
See application file for complete search history.

(56) References Cited

U.S. PATENT DOCUMENTS

| | | | |
|---|---|---|---|
| 2,929,207 A | 3/1960 | Peterson | |
| 2,955,424 A | 10/1960 | Hryniszak | |
| 2,984,977 A | 5/1961 | Embree | |
| 3,152,443 A | 10/1964 | Newland | |
| 3,170,292 A | 2/1965 | Howes | |
| 3,204,406 A | 9/1965 | Howes | |
| 3,209,536 A | 10/1965 | Howes | |
| 3,255,825 A | 6/1966 | Mouille et al. | |
| 3,488,947 A | 1/1970 | Miller | |
| 3,529,419 A | 9/1970 | Reed | |
| 3,762,161 A | 10/1973 | Pennig | |
| 3,874,811 A | 4/1975 | Dennison | |
| 3,942,908 A * | 3/1976 | Pilarczyk | F02C 6/06 415/199.2 |
| 4,030,288 A | 6/1977 | Davis | |
| 4,055,949 A | 11/1977 | Boudigues | |
| 4,141,212 A | 2/1979 | Koschier | |
| 4,251,987 A | 2/1981 | Adamson | |
| 4,498,291 A | 2/1985 | Jefferey | |
| 4,531,694 A | 7/1985 | Soloy | |
| 4,611,464 A | 9/1986 | Hetzer et al. | |
| 4,685,286 A | 8/1987 | Hetzer et al. | |
| 4,744,214 A | 5/1988 | Monsarrat | |
| 4,765,135 A | 8/1988 | Lardellier | |
| 4,815,282 A | 3/1989 | Wilkinson et al. | |
| 4,817,382 A | 4/1989 | Rudolph et al. | |
| 4,864,812 A | 9/1989 | Rodgers | |
| 4,934,140 A | 6/1990 | Dennison | |
| 5,119,624 A | 6/1992 | McKenna | |
| 5,159,808 A | 11/1992 | Kast | |
| 5,161,364 A | 11/1992 | Bruun | |
| 5,220,784 A | 6/1993 | Wilcox | |
| 5,309,708 A | 5/1994 | Stewart | |
| 5,473,883 A | 12/1995 | Naudet | |
| 6,041,589 A | 3/2000 | Giffin, III et al. | |
| 6,082,967 A | 7/2000 | Loisy | |
| 6,247,668 B1 | 6/2001 | Reysa | |
| 6,606,863 B2 | 8/2003 | Napier | |
| 6,735,954 B2 | 5/2004 | MacFarlane et al. | |
| 6,855,089 B2 | 2/2005 | Poulin | |
| 6,865,891 B2 | 3/2005 | Walsh et al. | |
| 6,895,741 B2 | 5/2005 | Rago et al. | |
| 6,901,759 B2 | 6/2005 | Frutschi | |
| 7,055,303 B2 | 6/2006 | Macfarlane et al. | |
| 7,144,349 B2 | 12/2006 | Mitrovic | |
| 7,168,913 B2 | 1/2007 | Lardellier | |
| 7,500,365 B2 | 3/2009 | Suciu et al. | |
| 7,552,591 B2 * | 6/2009 | Bart | F02C 7/32 60/792 |
| 7,690,185 B2 | 4/2010 | Linet et al. | |
| 7,698,884 B2 | 4/2010 | Maguire et al. | |
| 7,707,909 B2 | 5/2010 | Linet et al. | |
| 7,758,302 B2 | 7/2010 | Linet et al. | |
| 7,762,084 B2 | 7/2010 | Martis | |
| 8,176,725 B2 | 5/2012 | Norris | |
| 8,209,952 B2 | 7/2012 | Ress, Jr. | |
| 8,220,245 B1 | 7/2012 | Papandreas | |
| 8,350,398 B2 | 1/2013 | Butt | |
| 8,459,038 B1 | 6/2013 | Lickfold | |
| 8,464,511 B1 | 6/2013 | Ribarov et al. | |
| 8,500,583 B2 | 8/2013 | Goi et al. | |
| 8,516,789 B2 | 8/2013 | Kupratis | |
| 8,568,089 B2 | 10/2013 | Lemmers, Jr. et al. | |
| 8,621,871 B2 | 1/2014 | McCune et al. | |
| 8,689,538 B2 | 4/2014 | Sankrithi | |
| 8,794,922 B2 | 8/2014 | Bart et al. | |
| 8,845,292 B2 | 9/2014 | Lafont | |
| 8,853,878 B1 | 10/2014 | White | |
| 9,062,611 B2 | 6/2015 | Sheridan | |
| 9,126,691 B2 | 9/2015 | Cloft | |
| 9,145,834 B2 | 9/2015 | Frost et al. | |
| 9,239,004 B2 | 1/2016 | Kupratis | |
| 9,297,305 B2 | 3/2016 | Drachsler et al. | |
| 9,322,341 B2 | 4/2016 | Belleville | |
| 9,328,667 B2 | 5/2016 | MacFarlane | |
| 9,341,121 B2 | 5/2016 | Kupratis | |
| 9,353,848 B2 | 5/2016 | Blewett et al. | |
| 9,512,784 B2 | 12/2016 | Morgan et al. | |
| 9,828,911 B2 | 1/2017 | Burghardt | |
| 9,719,465 B2 | 8/2017 | Suciu | |
| 9,745,860 B1 | 8/2017 | Raskin | |
| 9,752,500 B2 | 9/2017 | Ullyott | |
| 9,752,610 B2 | 9/2017 | Rousseau | |
| 9,784,182 B2 | 10/2017 | Dhanuka | |
| 9,819,292 B2 | 11/2017 | Thatcher | |
| 9,890,704 B2 | 2/2018 | Speak et al. | |
| 9,926,849 B2 | 3/2018 | Frost et al. | |
| 9,932,858 B2 | 4/2018 | Miller | |
| 10,054,001 B2 | 8/2018 | Beutin et al. | |
| 10,072,570 B2 | 9/2018 | Kupratis | |
| 10,094,295 B2 | 10/2018 | Ullyott et al. | |
| 10,125,722 B2 | 11/2018 | Kupratis | |
| 10,132,198 B2 | 11/2018 | Baba | |

(56) References Cited

U.S. PATENT DOCUMENTS

| | | |
|---|---|---|
| 2003/0051483 A1 | 3/2003 | Napier |
| 2004/0065091 A1 | 4/2004 | Anderson |
| 2005/0060983 A1* | 3/2005 | Lardellier ............... F02K 1/48 60/226.1 |
| 2006/0010152 A1 | 1/2006 | Catalano |
| 2006/0137355 A1 | 6/2006 | Welch et al. |
| 2007/0022735 A1 | 2/2007 | Henry |
| 2007/0240427 A1* | 10/2007 | Ullyott ............... F01D 25/12 60/801 |
| 2008/0081733 A1 | 4/2008 | Hattenbach |
| 2008/0138195 A1 | 6/2008 | Kern |
| 2008/0148881 A1 | 6/2008 | Moniz et al. |
| 2009/0015011 A1* | 1/2009 | Colin ............... F01D 15/10 290/52 |
| 2009/0188334 A1 | 7/2009 | Merry |
| 2009/0288421 A1 | 11/2009 | Zeiner |
| 2009/0322088 A1 | 12/2009 | Dooley |
| 2010/0164234 A1 | 7/2010 | Bowman |
| 2010/0180568 A1 | 7/2010 | Sachs |
| 2010/0212285 A1 | 8/2010 | Negulescu |
| 2010/0281875 A1 | 11/2010 | Price |
| 2011/0056183 A1 | 3/2011 | Sankrithi |
| 2011/0056208 A1 | 3/2011 | Norris |
| 2011/0171030 A1 | 7/2011 | Swift |
| 2011/0284328 A1 | 11/2011 | Brandt |
| 2012/0121417 A1 | 5/2012 | Lafont |
| 2013/0031912 A1 | 2/2013 | Finney |
| 2013/0056982 A1 | 3/2013 | Gozdawa |
| 2013/0098066 A1 | 4/2013 | Gallet |
| 2013/0139518 A1 | 6/2013 | Morgan |
| 2013/0145769 A1 | 6/2013 | Norris |
| 2013/0186058 A1 | 7/2013 | Sheridan |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0150401 A1 | 6/2014 | Venter |
| 2014/0250862 A1 | 9/2014 | Suciu et al. |
| 2014/0252160 A1 | 9/2014 | Suciu et al. |
| 2014/0255147 A1* | 9/2014 | Root ............... F01D 25/285 415/1 |
| 2014/0256494 A1 | 9/2014 | Lewis |
| 2014/0260295 A1 | 9/2014 | Ullyott |
| 2014/0290265 A1 | 10/2014 | Ullyott |
| 2014/0297155 A1 | 10/2014 | Chen |
| 2015/0013307 A1 | 1/2015 | Burghardt |
| 2015/0150401 A1 | 6/2015 | Bennett |
| 2015/0167549 A1 | 6/2015 | Ribarov |
| 2015/0292544 A1 | 10/2015 | Rousseau |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 | 2/2016 | Frost |
| 2016/0090871 A1 | 3/2016 | Olsen |
| 2016/0169118 A1 | 6/2016 | Duoung |
| 2016/0201490 A1 | 7/2016 | Scott |
| 2016/0208690 A1* | 7/2016 | Zimmitti ............... F02K 3/06 |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0319845 A1 | 11/2016 | Molnar |
| 2016/0333791 A1 | 11/2016 | Snyder et al. |
| 2016/0341214 A1* | 11/2016 | O'Toole ............... F04D 29/522 |
| 2016/0363055 A1 | 12/2016 | Edwards |
| 2017/0108084 A1 | 4/2017 | Chmylkowski |
| 2017/0122122 A1 | 5/2017 | Lepretre |
| 2017/0191381 A1 | 7/2017 | Baba |
| 2017/0211477 A1 | 7/2017 | Menheere |
| 2017/0211484 A1 | 7/2017 | Sheridan |
| 2017/0191413 A1 | 8/2017 | Haskin |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey |
| 2018/0016989 A1 | 1/2018 | Abe |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0135522 A1 | 5/2018 | Mitrovic et al. |
| 2018/0149091 A1 | 5/2018 | Howell et al. |
| 2018/0163640 A1 | 6/2018 | Dubreuil |
| 2018/0171815 A1 | 6/2018 | Suciu et al. |
| 2018/0172012 A1 | 6/2018 | Plante |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

European Search Report dated Mar. 21, 2018 in related EP application No. 17182094.7.

European Search Report dated Apr. 6, 2018 in related EP application No. 17193893.9.

European Search Report dated May 25, 2018 in related EP application No. 17191309.8.

European Search Report dated May 25, 2018 in related EP application No. 171862493.

European Search Report dated Nov. 30, 2017 in counterpart EP application No. 17182102.8.

European Search Report dated Dec. 12, 2017 in related EP application No. 17182076.4.

European Search Report dated Dec. 12, 2017 in related EP application No. 17182096.2.

European Search Report dated Jan. 31, 2018 in related EP application No. 17185796.4.

European Search Report received on Jul. 2, 2018 in relating EP application No.° 18154161.6.

(56) References Cited

OTHER PUBLICATIONS

A New Approach to Turboshaft Engine Growth, M. A. Compagnon, General Electric Company, Lynn,Massachusetts pp. 80-41-1 to 80-41-6, May 13, 1980.
United Training Corp., PT6 Descriptive Course and Guide to Troubleshooting, Dec. 2016, Pub: United Training Corp., pp. 1-6 (Year: 2016).
Flight International, PT6: Turboprop Phenomenon, Jan.31-Feb. 6, 1990, REED Business Publishing Ltd, pp. 32-36. (Year: 1990).
Guy Norris, GE Takes on PT6 Engine With Advanced Turboprop, Nov. 17, 2015, Aviation Week Intelligence Network, pp. 1-3 (Year: 2015).

* cited by examiner

Fig_2

MULTI-SPOOL GAS TURBINE ENGINE ARCHITECTURE

CROSS-REFERENCE TO RELATED APPLICATIONS

This application claims priority from U.S. provisional patent application Nos. 62/363,956, filed Jul. 19, 2016, 62/363,955, filed Jul. 19, 2016; 62/363,952 filed Jul. 19, 2016; 62/363,949 filed Jul. 19, 2016; 62/363,947 filed Jul. 19, 2016 and U.S. application Ser. No. 15/266,321 filed Sep. 15, 2016, the entire contents of each of which are incorporated by reference herein.

TECHNICAL FIELD

The application relates generally to gas turbine engine and, more particularly, to a multi-spool engine architecture.

BACKGROUND OF THE ART

Multi-spool gas turbine engines typically have a tower shaft for providing a drive input to an accessory gear box (AGB) asymmetrically mounted on a radially outer surface of the engine case. Such engine architecture may contribute to an increase in the diameter of the engine envelope. Also, the extension of the tower shaft through the gaspath may impact the engine's aerodynamic efficiency.

There is, thus, a need for improvement.

SUMMARY

In one aspect, there is provided a reverse flow gas turbine engine comprising: a low pressure (LP) spool and a high pressure (HP) spool rotatable independently about an engine axis; the LP spool comprising an LP turbine, an LP compressor and an LP shaft drivingly connected to the LP turbine, the LP turbine disposed forward of the LP compressor relative to a direction of travel of the engine; the HP spool comprising an HP turbine, an HP compressor and an HP shaft drivingly connecting the HP turbine to the HP compressor, the HP compressor disposed forward of the LP compressor and in fluid communication therewith, the HP turbine disposed aft of the LP turbine and in fluid communication therewith; an accessory gear box (AGB) drivingly connected to the HP spool, the LP compressor disposed axially between the HP compressor and the AGB, and a gear train drivingly coupling the LP shaft to the LP compressor, the gear train disposed aft of the LP compressor.

In another aspect, there is provided a multi-spool gas turbine engine comprising: a low pressure (LP) spool; a high pressure (HP) spool, the LP spool and the HP spool being independently rotatable about a central axis, the LP pressure spool comprising an LP compressor and an LP turbine, the HP spool comprising an HP turbine and an HP compressor; an accessory gear box (AGB) drivingly connected to the HP spool, the LP compressor disposed axially between the HP compressor and the AGB, and a gear train drivingly coupling the LP compressor to the LP turbine, the gear train disposed on an AGB facing side of the LP compressor.

DESCRIPTION OF THE DRAWINGS

Reference is now made to the accompanying figures in which.

DETAILED DESCRIPTION

Figure 1:
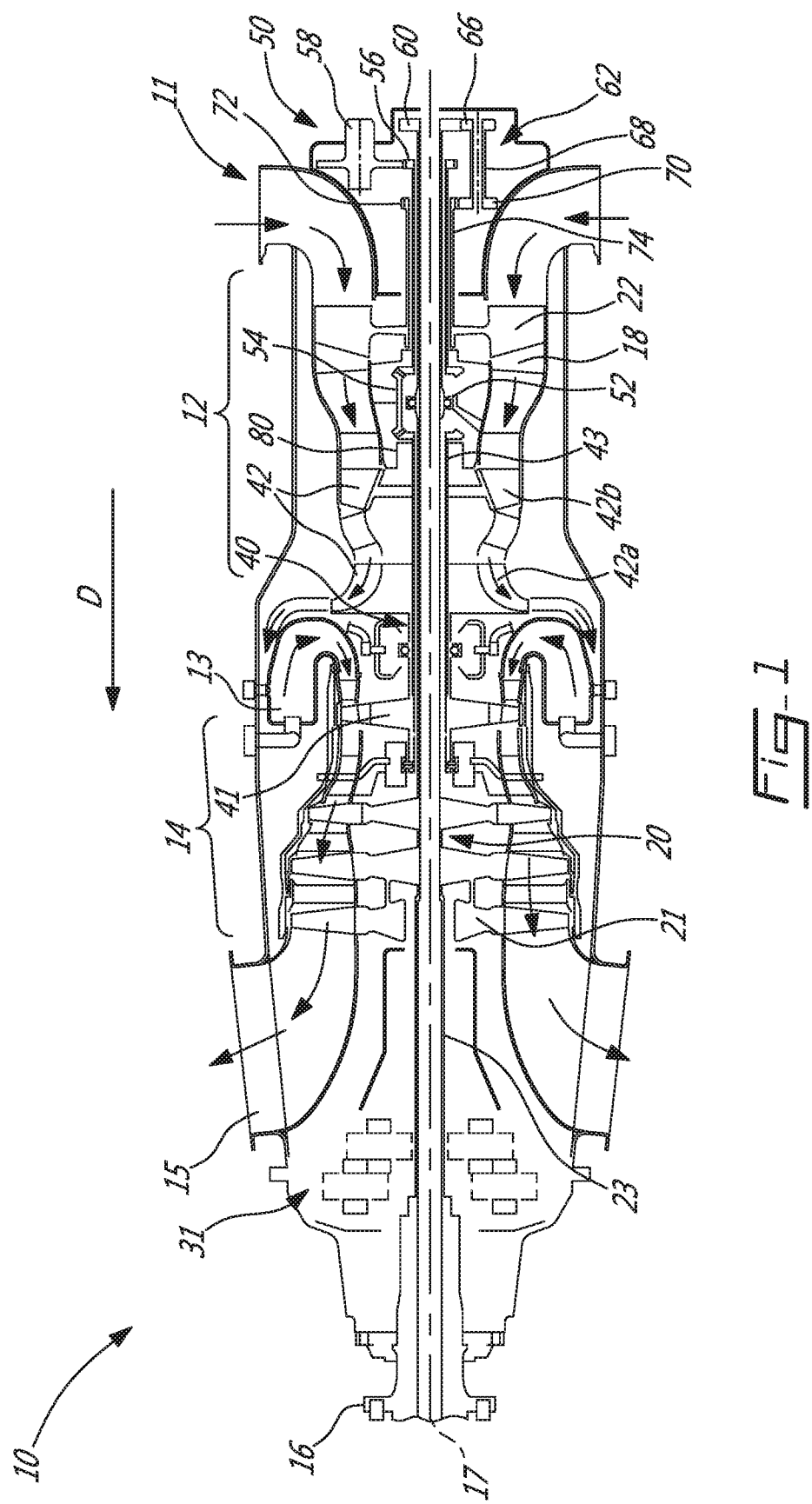
FIG. 1 is a schematic cross-sectional view of a multi-spool gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The rotatable load can, for instance, take the form of a propeller or a rotor, such as a helicopter main rotor. Depending on the intended use, the engine 10 can be configured as a turboprop engine or a turboshaft engine. FIG. 1 illustrates a turboprop configuration. The gas turbine engine 10 has a centerline or longitudinal center axis 17 about which the compressor and turbine rotors rotate.

The gas turbine engine 10 has an axially extending central core which defines a gaspath 18 through which gases flow, as depicted by flow arrows in FIG. 1. The exemplary embodiment shown in FIG. 1 is a "reverse-flow" engine because gases flow through the gaspath 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gaspath 18 of the engine 10 disclosed herein can be better appreciated by considering that the gases flow through the gaspath 18 in the same direction D as the one along which an aircraft engine travels during flight. Stated differently, in the non-limitative example shown in FIG. 1, gases flow through the engine 10 from a rear end thereof towards the output shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about the axis 17. The term "spool" is herein intended to broadly refer to drivingly connected turbine and compressor rotors and is, thus, not limited to a compressor and turbine assembly on a single shaft. As will be seen hereinbelow, it also includes a rotary assembly with multiple shafts geared together.

The LP spool 20 includes at least one component to compress the air that is part of the compressor section 12, and at least one component to extract energy from the combustion gases that is part of the turbine section 14. More particularly, the LP spool 20 has an LP turbine 21, also known as a power turbine, which may include different number of stages (three stages in the illustrated embodiment), and which drives an LP compressor 22 (also referred to as a boost). The LP turbine 21 drives the LP compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the center axis 17. In the depicted embodiment, both the LP turbine 21 and the LP compressor 22 include rotatable components having an axis of rotation that is coaxial with the center axis 17. It is understood that they may include one or more stages depending upon the desired engine thermodynamic cycle.

The LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises an LP shaft 23 coaxial with engine axis 17. The LP turbine 21 is drivingly connected to the LP shaft 23. The LP shaft 23 allows the LP turbine 21 to drive the LP compressor 22 during operation of the engine 10. As will be discussed in greater details hereinbelow, the LP shaft 23 is drivingly coupled to the LP compressor 22 via a gear train, thereby allowing the LP compressor 22 to run at a different rotational speed from the LP turbine 21. This can provide more flexibility in the selection of design points for the LP compressor 22 while at the same time allowing to drivingly connect an axially mounted accessory gear box (AGB) to the HP spool 40 centrally through the LP compressor 22, thereby minimizing the engine envelope in a direction radial from the engine axis 17 as compared to conventional boosted engine with side-mounted AGBs driven via a tower shaft.

Still referring to FIG. 1, it can be appreciated that the LP shaft 23 extends axially forwardly from the LP turbine 21 for driving the output shaft 16. The LP shaft 23 is drivingly connected to the output shaft 16 via a suitable reduction gear box (RGB) 31. A rotatable load, a propeller (not shown) according to the illustrated example, is connectable to a front end of the output shaft 16. In this way, the LP turbine 21 can be used to drive the rotatable load (e.g. the propeller) at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP shaft 23, the RGB 31 and the output shaft 16 coming out forwardly from the RGB 31. The rotatable load can therefore be any suitable component, or any combination of suitable components, that is capable of receiving the rotational drive from the LP turbine section 21.

The RGB 31 processes and outputs the rotational drive transferred thereto from the LP turbine 21 via the LP shaft 23 through known gear reduction techniques. The RGB 31 allows for the load (e.g. the propeller according to the illustrated turboprop example) to be driven at its optimal rotational speed, which is different from the rotational speed of the LP turbine 21. The RGB 31 is axially mounted at the front end of the engine 10. The RGB 31 has an input and an output axis parallel (coaxial in the illustrated embodiment) to the central axis 17 of the engine 10.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the LP shaft 23.

The LP shaft 23 with the portions thereof extending forward and aft of the LP turbine 21 provides the engine 10 with bidirectional drive. Modularity criteria for gas turbine engines may motivate the use of distinct shaft sections in opposed axial directions from the LP turbine 21. The LP shaft sections may be directly or indirectly connected together. Alternately, as shown in FIG. 1, the LP shaft 23 can be integral with a first portion of the LP shaft extending axially rearwardly from the LP turbine 21, and a second portion (a power turbine segment) extending between the RGB 31 and the LP turbine 21 forwardly from the LP turbine 21. Whether the LP shaft 23 is integral or segmented, the LP turbine 21 provides rotational drive outputted at each end of the LP shaft 23.

According to the non-limiting embodiment illustrated in FIG. 1, the LP shaft 23 is a one piece shaft and extends axially through a central bore of the LP compressor 22 to a location aft of the LP compressor 22 for connection with an axially mounted boost gear train disposed on an aft facing side of the LP compressor 22, as will discussed in further details hereinbelow. The use of such a one piece LP shaft 23 may allow the shaft to be introduced in the engine at the end of the assembly process in a single operation, thereby simplifying the assembly procedure.

However, it is understood that the LP shaft 23 is not limited to the configuration depicted in FIG. 1. As mentioned above, instead of being provided in the form of a one piece through shaft, it could be divided into serially interconnectable sections. As exemplified in FIG. 5, splines 90 or other suitable connections could be provided between adjacent LP shaft sections 23a, 23b to transfer torque from the LP turbine 21.

In light of the preceding, it can be appreciated that the LP turbine 21 drives both the rotatable load and the LP compressor 22. Furthermore, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g. propeller, RGB 31, etc.) as well as to drive elements to the rear of the LP turbine (e.g. LP compressor 22). This configuration of the LP turbine 21 allows it to simultaneously drive the rotatable load and the LP compressor 22.

Still referring to FIG. 1, the HP spool 40 has at least one component to compress the air that is part of the compressor section 12, and at least one component to extract energy from the combustion gases that is part of the turbine section 14. The HP spool 40 is also disposed along the center axis 17 and includes a HP turbine 41 (also referred to as the compressor turbine) drivingly engaged (e.g. directly connected) to an HP compressor 42 by an HP shaft 43 rotating independently of the LP shaft 23. In the illustrated embodiment, the HP shaft 43 is a hollow shaft which rotates around the LP shaft 23. That is the LP shaft 23 extends axially through the HP shaft 43. The HP turbine 41 and the HP compressor 42 may include one or more stages of rotors, depending upon the desired engine thermodynamic cycle, for example. In the depicted embodiment, the HP compressor 42 includes a centrifugal compressor 42a or impeller and an axial compressor 42b, both of which are driven by the HP turbine 41. During operation of the engine 10, torque is transferred from HP turbine 41 to the HP compressor 42 via HP shaft 43.

In the exemplified reverse flow engine configuration, the HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41. This arrangement provides for a boosted reverse flow engine.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine section when compared to the HP turbine 41. The LP turbine 21 is sometimes referred to as the "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP shaft 43 extends concentrically about the LP shaft 23 and is independently rotatable relative thereto. The relative rotation between the HP shaft 43 and the LP shaft 23 allow the shafts 23, 43 to rotate at different rotational speeds, thereby allowing the HP compressor 42 and the LP compressor 22 to rotate at different rotational speeds. The HP shaft 43 can be mechanically supported by the LP shaft 23 using bearings or the like.

Still referring to the embodiment shown in FIG. 1, the engine 10 also includes an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs.

According to the illustrated embodiment, the AGB 50 is concentrically mounted axially aft of the LP compressor 22 as an axial extension of the engine envelope. The axial positioning of the AGB 50 allows minimizing the overall radial envelope of the engine as compared to a split compressor or boosted engine having the AGB mounted on a side of the engine and connected to the HP spool via a tower shaft. In the illustrated embodiment, the AGB 50 is accommodated within the envelope of the engine in a plane normal to the central axis 17.

In the illustrated embodiment, the AGB input drive axis is coaxial to the LP compressor centerline and, thus, the engine axis 17. By so aligning the input axis of the AGB 50 relative to the LP compressor centerline, the drive input to the AGB 50 can be provided centrally through the LP compressor 22, thereby eliminating the need for a tower shaft and an externally mounted gear arrangement. However, unlike conventional reverse flow engines (like the well-known PT6 engine manufactured by Pratt & Whitney Canada), which do not include a compressor boost, the presence of the LP compressor 22 axially between the HP compressor 42 and the AGB 50 physically interferes with the connection of the AGB 50 with the HP spool 40, which is disposed on the opposed axially facing side of the LP compressor 22. In the illustrated embodiment, this particular problem is overcome by extending the HP shaft 43 through a central bore or passage in the LP compressor 22. The HP shaft 43 thus provides a drive input to the AGB 50 coaxial to the engine axis 17. According to the embodiment illustrated in FIGS. 1-3, the HP shaft 43 is segmented between the HP compressor 42 and the LP compressor 22 to allow for the introduction of a bearing 52 mounted to a support 53 to provide support to the LP shaft 23 between the HP compressor 42 and the LP compressor 22. As best shown in FIG. 3, a gear 54 is provided to drivingly couple the HP compressor shaft segment 43a of the HP shaft 43 to an AGB drive input shaft segment 43b, which may also be viewed as being an extension of the HP shaft 43. The gear 54 may be provided in the form of a bevel gear having a 1:1 speed ratio. As shown in FIG. 3, the bevel gear may be set to have a rotation axis perpendicular to the rotation axis of the HP shaft segments 43a, 43b. Such a gear arrangement allows for the installation of a support and bearing structure for supporting the LP shaft 21. Such a support may be suitable when the LP shaft 43 is provided in the form of a one-piece shaft or in order to address specific shaft dynamic requirements.

The AGB drive input shaft segment 43b projects axially into the AGB 50 and is provided at a distal end thereof with a gear 56, which is in meshing engagement with an associated AGB output gear 58. In the illustrated example, the AGB output gear 58 has a rotation axis parallel to the engine axis 17. The output gear 58 is drivingly connected to accessories (not shown). It is understood that the accessories gear train in the AGB 50 can adopt various configurations, including multiple outputs and different gear ratios.

Figure 2:
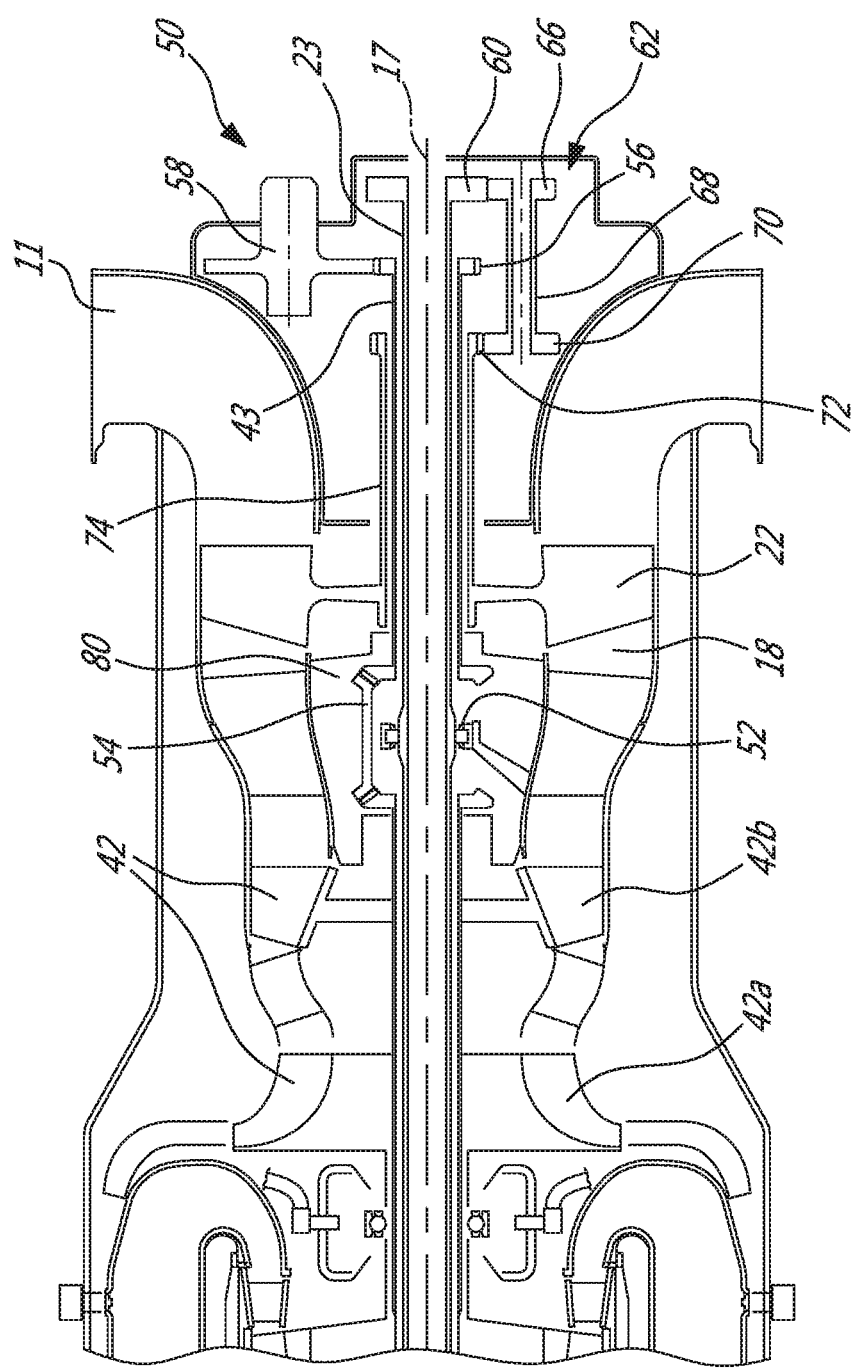
FIG. 2 is an enlarged cross-section of the engine shown in FIG. 1 and illustrating a gear driven low pressure (LP) compressor and an axially mounted accessory gearbox (AGB) driven centrally through the LP compressor.
Figure 3:
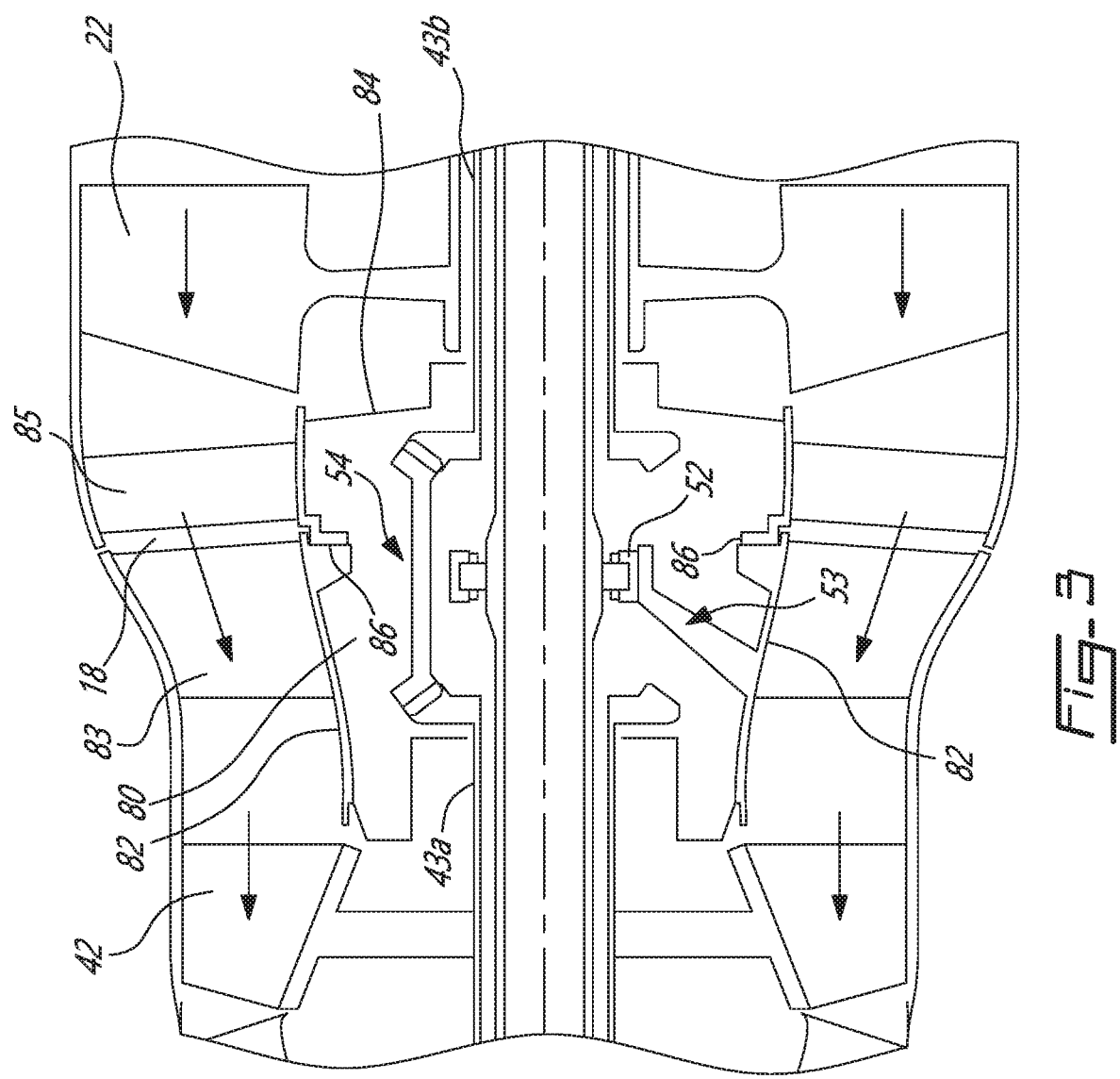
FIG. 3 is an enlarged cross-section view similar to FIG. 2 and illustrating a gear and shaft support arrangement in an internal cavity between the HP and the LP compressor.

Referring to FIGS. 1 and 2, it can be appreciated that a boost gear train 62 is integrated to the AGB 50 to drivingly couple the LP shaft 23 and, thus, the LP turbine 21 to the LP compressor 22. As mentioned herein above, the gear connection between the LP turbine 21 and the LP compressor 22 is advantageous in that it allows driving the LP compressor 22 at a different speed than the LP turbine 21. It can thus allow for overall thermodynamic cycle performance improvement.

The LP shaft 23 projects all the way to the aft end of the engine into the AGB 50 axially beyond the HP shaft 43 for connection with the gear train 62. The gear train 62 comprises an input gear 60 provided at the distal end portion of the LP shaft 23, the end portion which projects outwardly of the HP shaft 43. The input gear 60 is in meshing engagement with a second gear 66 mounted at an aft end of a transfer shaft 68 having a rotation axis parallel to the engine axis 17. A third gear 70 is provided at an opposed forward end of the transfer shaft 68 for meshing engagement with a fourth gear 72 provided at the distal end of a LP compressor shaft 74 projecting axially from an aft facing surface of the LP compressor 22. As shown in FIGS. 1 and 2, the LP compressor shaft 74 is a hollow shaft extending concentrically about the HP shaft 43. The LP compressor shaft 74 ends at a location forward of the HP shaft 43, to thereby allow the HP shaft 43 to be drivingly connected to gear 58. It can be appreciated that the relative lengths of the shafts 23, 43, 74 projecting into the AGB 50 allows for the various gear connections (the innermost shaft having the deepest AGB penetration).

Figure 4:
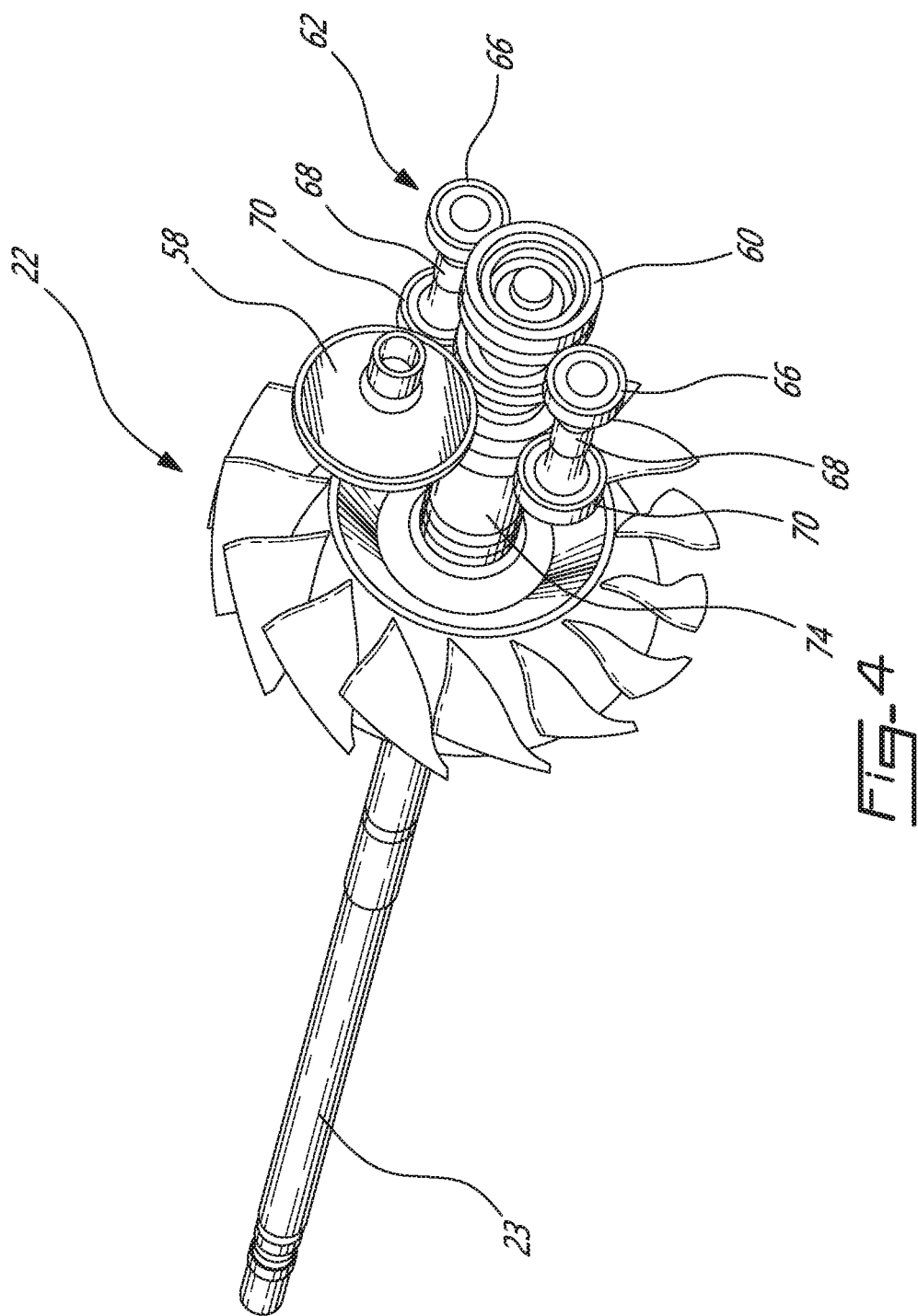
FIG. 4 is an isometric view of a dual gear train between the LP shaft and the LP compressor.

The boost gear train 62 can adopt various configurations and is, thus, not limited to the single gear train architecture shown in FIGS. 1 and 2. For instance, as shown in FIG. 4, the gear train 62 could be provided as a dual gear train to provide first and second drive inputs to the LP compressor 22. The dual gear train 62 could comprise first and second sets of gears provided on opposed lateral sides of the LP shaft 23 and drivingly connected to the same input gear 60. The gears may be identical to the gears described above with respect to FIGS. 1 and 2.

As mentioned herein above, the gear connection between the LP turbine 21 and the LP compressor 22 also allows driving the LP compressor at a different speed than the LP turbine. It can thus allow for overall thermodynamic cycle performance improvement. The positioning of the gear train 62 at the aft end of the engine in a common housing with the AGB 50 contributes to facilitate the engine assembly and eliminate the need for a separate casing and lubricating structure for the boost gear train 62. One containment and lubricating system can be used for both the AGB gears 56, 58 and the boost gear train 62. Such an integration of the AGB and the boost gear train in a common housing facilitate the access to the gears for adjustment purposes while minimizing part counts. However, it is understood that the boost gear train 62 could be provided as a separate unit on the AGB facing side of the LP compressor 22 and, thus, axially aft of the LP compressor 22 in a reverse flow engine configuration. The fact the boost gear train 62 has a drive input coaxial to the engine axis 17 also provides for a compact geared engine arrangement while at the same time contributing to ease the assembly process.

In the embodiment illustrated in FIG. 1, the case of the air inlet forms part of the AGB 50 and boost gear train 62 housing. However, it is understood that the AGB and the boost gear train 62 could be packaged as a stand-alone unit.

As can be appreciated from FIG. 3, the gear 54 and the bearing 52 are housed in an internal cavity 80 radially inwardly of the gaspath 18 between the HP compressor 42 and the LP compressor 22. The internal cavity 80 is bounded by the compressor inner gaspath wall 82. The internal cavity 80 communicates with the AGB 50 via the central bore extending axially through the LP compressor 22, thereby providing for a combined bearing/gear train oil chamber. Access to the gear 54 and bearing 52 may be provided by a split casing assembly including first and second separable casing sections 82, 84 having an interface 86 axially between the HP compressor 42 and the LP compressor 22. The casing assembly may form part of a split inlet guide vane structural case architecture. For instance, the first casing section 82 could be a cast stator including a circumferential row of guide vanes 83 and the second casing section 84 could be another cast stator including another circumferential of guide vanes 85. The guide vanes 85 and 83 cooperate to direct the flow of air from the LP compressor 22 to the HP compressor 42. The adjacent guide vanes 83, 85 are, thus, part of two separate castings. The interface 86 may be provided in the form of axially facing flanges depending radially inwardly from the inner endwall of the separate vane castings. Any suitable fasteners may be used to releasably retain the casing sections together.

Figure 5:
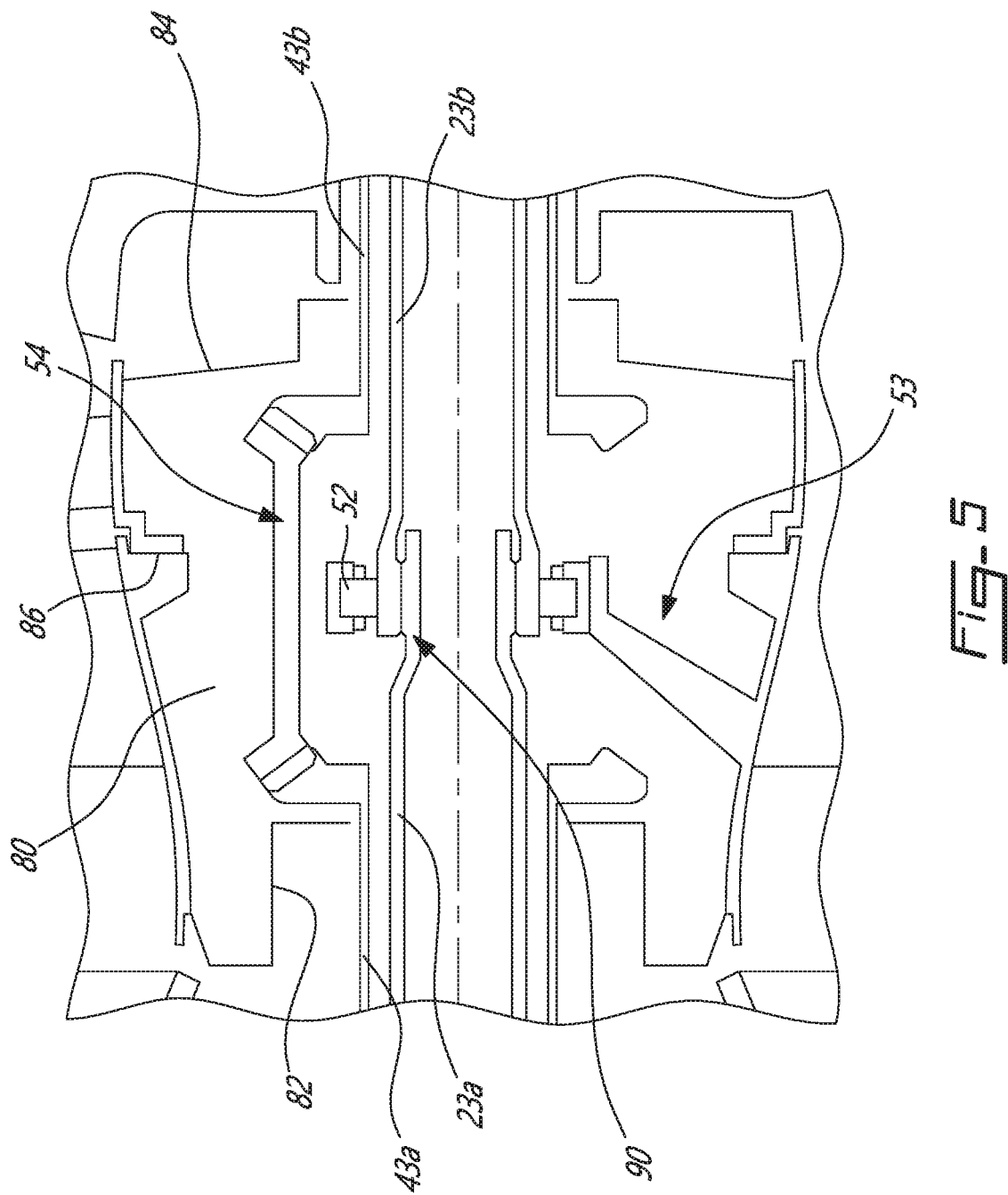
FIG. 5 is an enlarged cross-section view similar to FIG. 3 but illustrating a segmented LP shaft with a spline connection between the HP compressor and the LP compressor.

As shown in FIG. 5, the internal cavity 80 could also house a connecting structure (e.g. the spline 90) for drivingly connecting a first LP shaft section 23a to a second LP shaft section 23b axially between the HP compressor 42 and the LP compressor 22. This would facilitate access different support and coupling structures all at once. Furthermore, as shown in FIG. 5, the bearing 52 may be provided at the spline connection 90.

Figure 6:
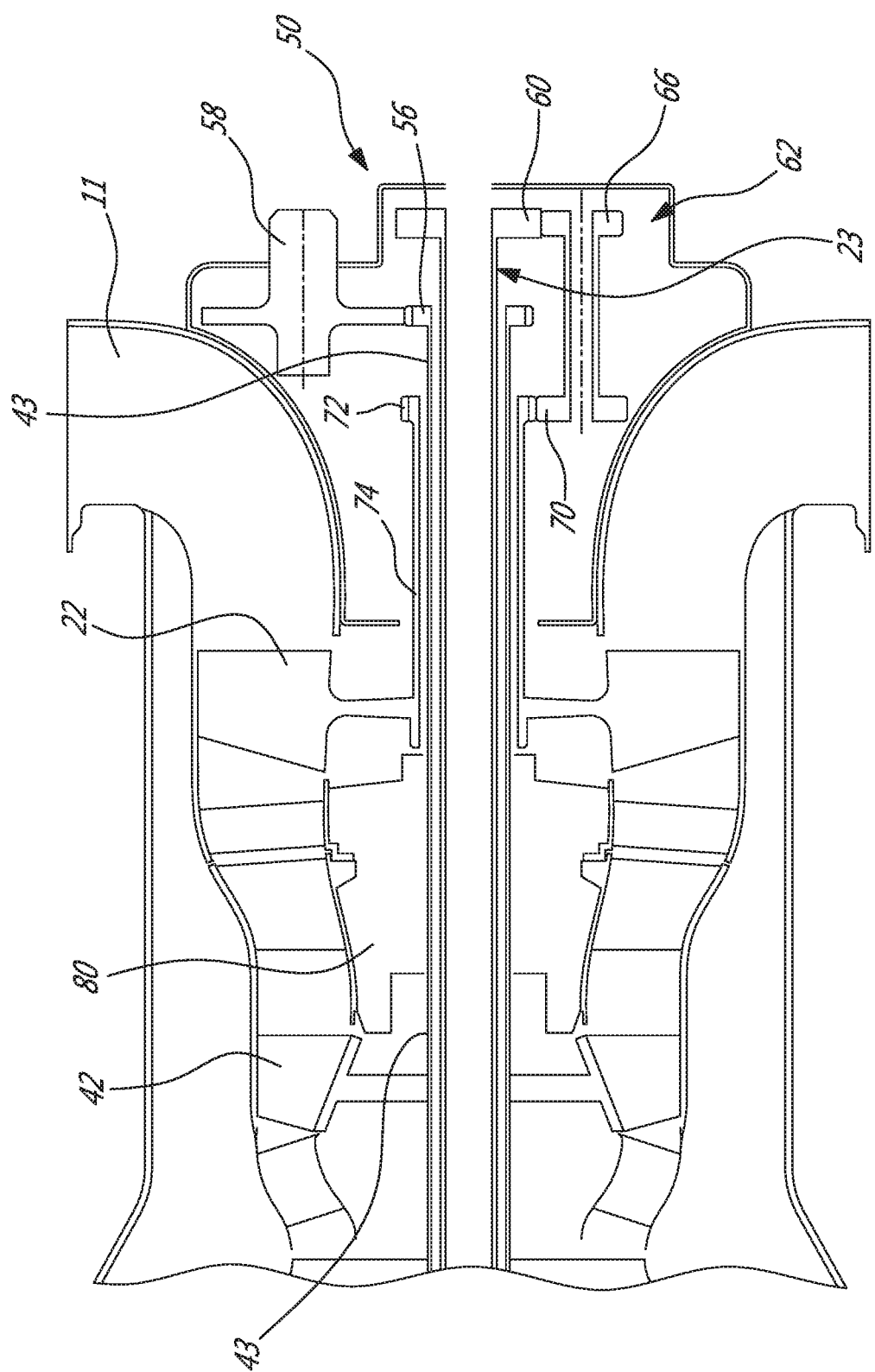
FIG. 6 is a cross-section view illustrating an alternative in which the LP shaft is not supported between the HP compressor and the LP compressor and in which the HP shaft is not interrupted to accommodate a support for the LP shaft.

According to another aspect shown in FIG. 6, no support structure could be provided in the internal cavity 80 for supporting the LP shaft 23. As such no discontinuity in the HP shaft 43 is required to accommodate a LP shaft support and, thus, the HP shaft 43 could extend continuously from the HP compressor 42 to the AGB 50 and the gear 54 could be omitted.

It can thus be appreciated that at least some of the embodiments of the engine 10 disclosed herein provide a mechanical architecture of turbomachinery that allows for a split compressor system in a compact PT6 type configuration. Such a split compressor engine in a reverse flow or through flow configuration may be used for aircraft nose installations, as well as for wing installations. The boost gear train 62 eliminates the need for a tower shaft for connecting the AGB 50 to the HP spool 40. Indeed, with this engine architecture, the HP shaft can be axially directly connected to the AGB, the AGB having an input axis coaxial to the engine axis 17. In this way no shaft has to be passed across the gaspath to drivingly connect the HP spool 40 to the AGB 50, thereby avoiding performances losses. The compressor aerodynamics can be improved by eliminating the service strut typically used to pass the tower shaft. The engine weight may be reduced by eliminating the need of an upstream transfer case. The position of the hardware used to build the gear trains may be designed for an optimal clearance from the LP rotor center. It can also be appreciated that at least some embodiments allow to locate the AGB along the engine centerline aft of the LP compressor. This may provide installation benefits, reduce cost and weight relative to an externally mounted tower shaft driven AGB.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A reverse flow gas turbine engine comprising:
a low pressure (LP) spool and a high pressure (HP) spool rotatable independently of one another about an engine axis;
the LP spool comprising an LP turbine, an LP compressor and an LP shaft drivingly connected to the LP turbine;
the HP spool comprising an HP turbine, an HP compressor and an HP shaft drivingly connecting the HP turbine to the HP compressor, the HP compressor in fluid communication with the LP compressor;
an accessory gear box (AGB) drivingly connected to the HP spool, the AGB mounted axially in line with the engine axis, the LP compressor disposed axially between the HP compressor and the AGB, and
a gear train drivingly coupling the LP shaft to the LP compressor via an LP compressor shaft projecting from a side of the LP compressor facing the AGB, the gear train disposed axially on the side of the LP compressor facing the AGB,
wherein the HP shaft extends axially through the LP compressor shaft in driving engagement with the AGB.

2. The reverse flow gas turbine engine defined in claim 1, wherein the gear train coupling the LP shaft to the LP compressor and the AGB share a common housing.

3. The reserve flow gas turbine engine defined in claim 1, wherein the LP shaft extends axially through a central bore of the LP compressor and projects axially beyond the LP compressor.

4. The reverse flow gas turbine engine defined in claim 3, wherein the LP shaft extends into the AGB.

5. The reserve flow gas turbine engine defined in claim 3, wherein the gear train is disposed in the AGB and is drivingly coupled to an end of the LP shaft.

6. The reverse flow gas turbine engine defined in claim 1, wherein the gear train is a dual gear train comprising first and second drive inputs to the LP compressor.

7. The reverse flow gas turbine engine defined in claim 5, wherein the gear train comprises first and second sets of gears, the LP shaft being drivingly coupled to both said first and second sets of gears for driving the LP compressor.

8. The reverse flow gas turbine engine defined in claim 1, wherein the LP shaft is a one piece shaft having a power turbine shaft portion extending forwardly of the LP turbine and an LP compressor shaft portion extending rearwardly from the LP turbine to a location aft of the LP compressor.

9. The reverse flow gas turbine engine defined in claim 8, wherein the LP shaft extends centrally through the HP shaft, and wherein the LP shaft is supported by at least one bearing mounted in an internal cavity disposed axially between the HP compressor and the LP compressor and radially inwardly of an annular gas path between the HP compressor and LP compressor.

10. The reverse flow gas turbine engine defined in claim 9, wherein the HP shaft comprises a first shaft section projecting aft of the HP compressor and a second shaft section projecting axially through the LP compressor into the AGB, and wherein a gear is disposed in the internal cavity to drivingly connect the first shaft section to the second shaft section.

11. The reverse flow gas turbine engine defined in claim 10, wherein the gear is a bevel gear having a rotation axis perpendicular to the engine axis.

12. The reverse flow gas turbine engine defined in claim 1, comprising a split casing including first and second separable casing sections having an interface between the HP compressor and the LP compressor to provide access to an internal cavity disposed radially inwardly of an annular gaspath between the LP and HP compressors, the internal cavity housing at least one bearing supporting the LP shaft.

13. The reverse flow gas turbine engine defined in claim 12, wherein the HP shaft has a first shaft section projecting aft of the HP compressor and a second shaft section projecting axially through the LP compressor into the AGB, and wherein the first and second shaft sections are drivingly connected by a bevel gear housed in the internal cavity, the at least one bearing being disposed between said first and second shaft sections of the HP shaft.

14. The reverse flow gas turbine engine defined in claim 1, wherein the AGB has an input axis coaxial to the engine axis.

15. The reverse flow gas turbine engine defined in claim 14, wherein the HP shaft extends axially through a central bore of the LP compressor and projects axially aft of the LP compressor in driving engagement with the AGB.

16. A multi-spool gas turbine engine comprising: a low pressure (LP) spool; a high pressure (HP) spool, the LP spool and the HP spool rotatable independently of one another about a central axis, the LP pressure spool comprising an LP compressor, an LP turbine and an LP shaft extending axially from the LP turbine through a central bore of the LP compressor, the HP spool comprising an HP turbine, an HP compressor and an HP shaft drivingly connected to the HP turbine; an accessory gear box (AGB) drivingly connected to the HP spool, the AGB disposed on the engine so that the central axis extends through the AGB, the LP compressor disposed axially between the HP compressor and the AGB, and a gear train drivingly coupling the LP compressor to the LP turbine, the gear train disposed on an AGB facing side of the LP compressor, wherein the LP shaft is in driving engagement with the gear train, wherein the LP compressor has a hollow compressor shaft portion extending concentrically about the LP shaft, the hollow compressor shaft portion drivingly connected to the LP shaft by the gear train, wherein the HP shaft extends axially through the central bore of the LP compressor radially between the LP shaft and the hollow compressor shaft portion, the HP shaft being drivingly connected to the AGB.

17. The multi-spool gas turbine engine defined in claim 16, wherein the LP shaft extends into the AGB axially beyond the HP shaft and the hollow compressor shaft portion of the LP compressor.

18. The multi-spool gas turbine engine defined in claim 17, wherein the HP shaft has an end portion located axially between the hollow compressor shaft portion of the LP compressor and the LP shaft.

19. The multi-spool gas turbine engine defined in claim 16, wherein the HP shaft comprises first and second shaft sections drivingly coupled by a bevel gear disposed in a cavity between the HP compressor and the LP compressor radially inwardly of a gas path between the HP and LP compressors.

20. The multi-spool gas turbine engine defined in claim 19, wherein at least one bearing is provided in the cavity between the first and second shaft sections of the HP shaft, the at least one bearing supporting the LP shaft.

21. The multi-spool gas turbine engine defined in claim 16, wherein the gear train is a dual gear train comprising first and second sets of gears respectively disposed on opposed lateral sides of the LP shaft to provide first and second drive inputs to the LP compressor.

22. The multi-spool gas turbine engine defined in claim 19, wherein the cavity is defined by first and second casing sections having a mounting interface disposed between the HP compressor and the LP compressor, the first and second casing sections being separable to provide access to said cavity.

23. The multi-spool gas turbine engine defined in claim 16, wherein the engine is an aircraft engine having a reverse flow configuration including an air inlet disposed aft of the LP compressor along a direction of travel of the aircraft engine, and wherein the AGB is disposed aft of the air inlet.

24. The reverse flow gas turbine engine defined in claim 16, wherein the hollow compressor shaft portion extends concentrically about the LP shaft, the hollow compressor shaft portion drivingly connected to the LP shaft by the gear train, wherein the HP shaft extends axially through the central bore of the LP compressor radially between the LP shaft and the hollow compressor shaft portion.

* * * * *